US007843782B1

(12) United States Patent
Oberg

(10) Patent No.: US 7,843,782 B1
(45) Date of Patent: Nov. 30, 2010

(54) METHOD AND APPARATUS TO INCREASE STORAGE CAPACITY OF AN OPTICAL STORAGE MEDIUM

(75) Inventor: Mats Oberg, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 1213 days.

(21) Appl. No.: 11/446,808

(22) Filed: Jun. 5, 2006

Related U.S. Application Data

(60) Provisional application No. 60/734,444, filed on Nov. 8, 2005.

(51) Int. Cl.
  *G11B 7/00* (2006.01)
(52) U.S. Cl. .................................. 369/47.28; 369/53.34
(58) Field of Classification Search .............. 369/47.28, 369/53.34
  See application file for complete search history.

(56) References Cited

U.S. PATENT DOCUMENTS

| 2005/0068866 A1* | 3/2005 | Serrano et al. | 369/47.28 |
| 2005/0078583 A1* | 4/2005 | Suryono et al. | 369/53.31 |
| 2006/0187775 A1* | 8/2006 | Yin et al. | 369/44.28 |

OTHER PUBLICATIONS

Blu-ray Disc; White Paper Blue-ray Disc Format; 1.A Physical Format; Specifications for BD-RE; 2nd Editiion; Feb. 2006; 33 pages.
ECMA International; Standard ECMA-337; 2nd Edition/Dec. 2003; Data Interchange on 120 mm and 80 mm Optical Disk using +RW Format—Capacity: 4,7 and 1,46 Gbytes per Side (Recording speed up to 4X); 132 pages.
Standard ECMA-338; Dec. 2002; ECMA Standardizing Information and Communication Systems; 80 mm (1,46 Gbytes per side) and 120 mm (4.70 Gbytes per side) DVD Re-recordable Disk (DVD-RW); 159 pages.
ECMA International; Standard ECMA-359; 1st Edition/ Dec. 2004; 80 mm (1,46 Gbytes per side) and 120 mm (4,70 Gbytes per side) DVD Recordable Disk (DVD-R); 141 pages.
ECMA International; Standard ECMA-349; 2nd Edition; Jun. 2004; Data Interchange on 120 mm and 80 mm Optical Disk using +R Format—Capacity: 4.7 and 1,46 Gbytes per Side (Recording speed up to 8X); 148 pages.

* cited by examiner

*Primary Examiner*—Wayne R Young
*Assistant Examiner*—Latanya Bibbins

(57) ABSTRACT

A system for increasing storage capacity of an optical medium includes a demodulator module and a writing module. The demodulator module demodulates a wobble signal having a wobble period of N channel bits, has a demodulating period of M channel bits, and generates a phase error signal, where N and M are integers greater than 1, and M is greater than N. The writing module writes M bits on the optical medium during the wobble period of the N channel bits based on the phase error signal.

39 Claims, 13 Drawing Sheets

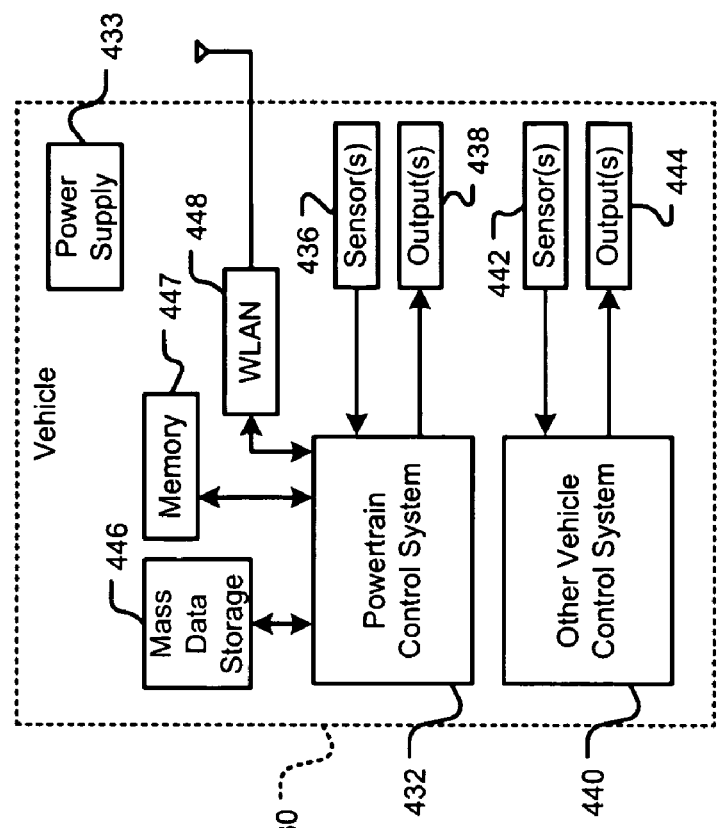
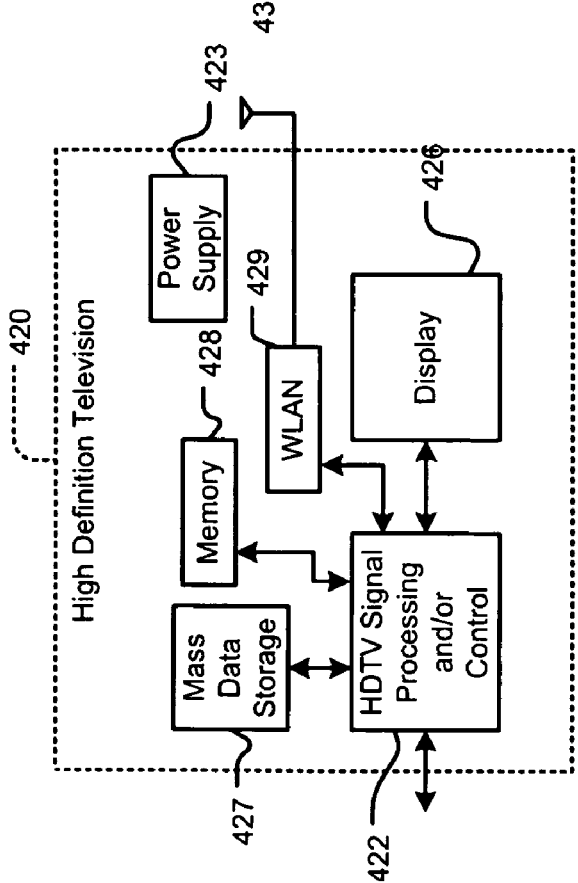
FIG. 8B
FIG. 8A

METHOD AND APPARATUS TO INCREASE STORAGE CAPACITY OF AN OPTICAL STORAGE MEDIUM

CROSS-REFERENCE TO RELATED APPLICATIONS

This application claims the benefit of U.S. Provisional Application No. 60/734,444, filed on Nov. 8, 2005. The disclosure of the above application is incorporated herein by reference in its entirety.

FIELD

The present disclosure relates to optical disk drives, and more particularly to systems and methods for increasing storage capacity of optical storage media.

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Optical disk drives use laser technology to store data on optical storage media, generally referred to as digital versatile disks (DVD's). Data is stored on DVD's in tracks having spiral paths. FIG. 1A shows a track 10 having a spiral path 12. The spiral path 12 of the track 10, however, is not perfectly spiral in shape. Instead, as shown in FIG. 1B, the spiral path 12 of the track 10 wobbles around an average centerline 14 of the spiral path 12 like a sinusoid 16.

Sinusoidal deviation of the track 10 from the average centerline 14 of the spiral path 12 of the track 10 is called a wobble. Phase-modulated data embedded in the wobble provides location information for the track 10. A wobble signal provides a measure of the sinusoidal deviation (i.e., the wobble) of the track 10.

When writing data on the track 10, a recorder follows the track 10 and locks a timing loop to the wobble signal of the track 10. The recorder uses the location information of the track 10 that is embedded in the wobble signal of the track 10 to align the writing apparatus to the track 10.

The storage capacity of a DVD depends on the diameter of the DVD and the recording format used to record data on the DVD. DVD's are generally 80 mm or 120 mm in diameter. The 80 mm DVD's typically store 1.46 GB of data per side. The 120 mm DVD's typically store 4.7 GB of data per side.

The recording formats used to record data on DVD's are standardized by European Computer Manufacturers Association (ECMA). For example, the ECMA-337 standard, which is incorporated herein by reference in its entirety, defines data interchange on 80 mm and 120 mm DVD's using +RW format at recording speeds of up to 4x. The ECMA-349 standard, which is incorporated herein by reference in its entirety, defines data interchange on 80 mm and 120 mm DVD's using +R format at recording speeds of up to 8x.

Additionally, DVD's can be recordable or re-writable. Data can be written only once on recordable DVD's. Thereafter, the recordable DVD's are read-only, and data cannot be written again on recordable DVD's. Therefore, recordable DVD's are also called read-only DVD's and are referred to as DVD+/-R. The letter "R" denotes recordable DVD's. The ECMA-359 standard, which is incorporated herein by reference in its entirety, defines characteristics of recordable DVD's. On the other hand, re-writable DVD's are re-recordable. That is, data can be written again on re-writable DVD's. In other words, data can be recorded on re-writable DVD's more than once. Therefore, re-writable DVD's are referred to as DVD+/-RW. The letters "RW" denote re-writable DVD's. The ECMA-338 standard, which is incorporated herein by reference in its entirety, defines characteristics of re-writable DVD's. Thus, DVD-R and DVD-RW that are 80 mm in diameter can store up to 1.46 GB of data per side. DVD-R and DVD-RW that are 120 mm in diameter can store up to 4.7 GB of data per side.

SUMMARY

A system comprises a demodulator module that demodulates a wobble signal having a wobble period of N channel bits, that has a demodulating period of M channel bits, and that generates a phase error signal, where N and M are integers greater than 1, and M is greater than N. The system comprises a writing module that writes M bits on an optical medium during the wobble period based on the phase error signal.

In another feature, the system further comprises an optical pickup unit (OPU) module that communicates with the writing module, that reads wobble information from the optical medium, and that writes data generated by the writing module on the optical medium. The system further comprises an analog front-end module that communicates with the OPU module, that processes the wobble information, and that generates the wobble signal.

In another feature, the system further comprises a land pre-pit module that communicates with the analog front-end module and that generates wobble data for the optical medium based on the wobble signal when the wobble information is stored on the optical medium as land pre-pit.

In another feature, the demodulator module generates the phase error signal based on the wobble signal and generates wobble data for the optical medium based on the wobble signal when the wobble information is stored on the optical medium as phase shifts.

In another feature, the system further comprises an analog-to-digital converter (ADC) module that converts the wobble signal from analog to digital format, that generates a digital wobble signal, and that outputs the digital wobble signal to the demodulator module. The demodulator module generates the phase error signal based on the digital wobble signal and generates wobble data for the optical medium based on the digital wobble signal when the wobble information is stored on the optical medium as phase shifts. The system further comprises a timing module that communicates with the demodulator module, that generates a clock signal based on the phase error signal, and that outputs the clock signal to the ADC module.

In another feature, the system further comprises a downsampler module that downsamples the digital wobble signal by a predetermined downsampling factor, that generates a downsampled wobble signal, and that outputs the downsampled wobble signal to the demodulator module. The demodulating period of the demodulator module is based on the predetermined downsampling factor. The demodulator module generates the phase error signal based on the downsampled wobble signal and generates wobble data for the optical medium based on the downsampled wobble signal when the wobble information is stored on the optical medium as phase shifts.

In another feature, the system further comprises a timing module that communicates with the demodulator module, that generates a clock signal based on the phase error signal, and that outputs the clock signal to the writing module.

In another feature, the optical medium is formatted using one of a red and a blue-violet laser.

In another feature, an optical disk drive comprises the system.

In still other features, a method comprises demodulating a wobble signal having a wobble period of N channel bits with a demodulating period of M channel bits, where N and M are integers greater than 1, and M is greater than N. The method comprises generating a phase error signal, and writing M bits on an optical medium during the wobble period based on the phase error signal.

In another feature, the method further comprises reading wobble information from the optical medium and writing data on the optical medium. The method further comprises processing the wobble information and generating the wobble signal. The method further comprises generating wobble data for the optical medium based on the wobble signal when the wobble information is stored on the optical medium as land pre-pit. The method further comprises generating the phase error signal based on the wobble signal and generating wobble data for the optical medium based on the wobble signal when the wobble information is stored on the optical medium as phase shifts.

In another feature, the method further comprises converting the wobble signal from an analog to a digital format and generating a digital wobble signal. The method further comprises generating the phase error signal based on the digital wobble signal and generating wobble data for the optical medium based on the digital wobble signal when the wobble information is stored on the optical medium as phase shifts. The method further comprises generating a clock signal based on the phase error signal and converting the wobble signal from an analog to a digital format based on the clock signal.

In another feature, the method further comprises downsampling the digital wobble signal by a predetermined downsampling factor and generating a downsampled wobble signal. The demodulating period is based on the predetermined downsampling factor. The method further comprises generating the phase error signal based on the downsampled wobble signal and generating wobble data for the optical medium based on the downsampled wobble signal when the wobble information is stored on the optical medium as phase shifts.

In another feature, the method further comprises generating a clock signal based on the phase error signal and writing the M bits on the optical medium during the wobble period based on the clock signal.

In still other features, a system comprises demodulator means having a demodulating period of M channel bits for demodulating a wobble signal having a wobble period of N channel bits, and for generating a phase error signal, where M and N are integers greater than 1, and M is greater than N. The system comprises writing means for writing M bits on an optical medium during the wobble period based on the phase error signal.

In another feature, the system further comprises optical pickup unit (OPU) means for communicating with the writing means, reading wobble information from the optical medium, and writing data generated by the writing means on the optical medium. The system further comprises analog front-end means for communicating with the OPU means, processing the wobble information, and generating the wobble signal.

In another feature, the system further comprises land pre-pit means for communicating with the analog front-end means and generating wobble data for the optical medium based on the wobble signal when the wobble information is stored on the optical medium as land pre-pit. The demodulator means generates the phase error signal based on the wobble signal and generates wobble data for the optical medium based on the wobble signal when the wobble information is stored on the optical medium as phase shifts.

In another feature, the system further comprises analog-to-digital converter (ADC) means for converting the wobble signal from analog to digital format, generating a digital wobble signal, and outputting the digital wobble signal to the demodulator means. The demodulator means generates the phase error signal based on the digital wobble signal and generates wobble data for the optical medium based on the digital wobble signal when the wobble information is stored on the optical medium as phase shifts. The system further comprises timing means for communicating with the demodulator means, generating a clock signal based on the phase error signal, and outputting the clock signal to the ADC means.

In another feature, the system further comprises downsampler means for downsampling the digital wobble signal by a predetermined downsampling factor, generating a downsampled wobble signal, and outputting the downsampled wobble signal to the demodulator means. The demodulating period of the demodulator means is based on the predetermined downsampling factor. The demodulator means generates the phase error signal based on the downsampled wobble signal and generates wobble data for the optical medium based on the downsampled wobble signal when the wobble information is stored on the optical medium as phase shifts.

In another feature, the system further comprises timing means for communicating with the demodulator means, generating a clock signal based on the phase error signal, and outputting the clock signal to the writing means.

In another feature, the optical medium is formatted using one of a red and a blue-violet laser.

In another feature, an optical disk drive comprises the system.

In still other features, a computer program executed by a processor comprises demodulating a wobble signal having a wobble period of N channel bits with a demodulating period of M channel bits, where N and M are integers greater than 1, and M is greater than N. The computer program comprises generating a phase error signal, and writing M bits on an optical medium during the wobble period based on the phase error signal.

In another feature, the computer program further comprises reading wobble information from the optical medium and writing data on the optical medium. The computer program further comprises processing the wobble information and generating the wobble signal. The computer program further comprises generating wobble data for the optical medium based on the wobble signal when the wobble information is stored on the optical medium as land pre-pit. The computer program further comprises generating the phase error signal based on the wobble signal and generating wobble data for the optical medium based on the wobble signal when the wobble information is stored on the optical medium as phase shifts.

In another feature, the computer program further comprises converting the wobble signal from an analog to a digital format and generating a digital wobble signal. The computer program further comprises generating the phase error signal based on the digital wobble signal and generating wobble data for the optical medium based on the digital wobble signal when the wobble information is stored on the optical medium as phase shifts. The computer program further comprises generating a clock signal based on the phase error signal and converting the wobble signal from an analog to a digital format based on the clock signal.

In another feature, the computer program further comprises downsampling the digital wobble signal by a predetermined downsampling factor and generating a downsampled wobble signal. The demodulating period is based on the predetermined downsampling factor. The computer program further comprises generating the phase error signal based on the downsampled wobble signal and generating wobble data for the optical medium based on the downsampled wobble signal when the wobble information is stored on the optical medium as phase shifts.

In another feature, the computer program further comprises generating a clock signal based on the phase error signal and writing the M bits on the optical medium during the wobble period based on the clock signal.

In still other features, a system comprises a downsampler module that downsamples a wobble signal having a wobble period of N channel bits, where N is an integer greater than 1. The system comprises a demodulator module that demodulates an output of the downsampler module and generates a phase error signal. The system comprises a writing module that writes M bits on an optical medium during the wobble period based on the phase error signal, where M is an integer greater N.

In another feature, the demodulator module has a demodulating period that is based on at least one of N and a predetermined downsampling factor of the downsampler module.

In another feature, the system further comprises an optical pickup unit (OPU) module that communicates with the writing module, that reads wobble information from the optical medium, and that writes data generated by the writing module on the optical medium. The system further comprises an analog front-end module that communicates with the OPU module, that processes the wobble information, and that generates an analog wobble signal.

In another feature, the system further comprises a land pre-pit module that communicates with the analog front-end module and that generates wobble data for the optical medium based on the analog wobble signal when the wobble information is stored on the optical medium as land pre-pit.

In another feature, the system further comprises an analog-to-digital converter (ADC) module that converts the analog wobble signal from an analog to a digital format and that generates the wobble signal based on the analog wobble signal. The system further comprises a timing module that communicates with the demodulator module, that generates a clock signal based on the phase error signal, and that outputs the clock signal to the ADC module and the writing module.

In another feature, the demodulator module generates wobble data for the optical medium when wobble information is stored on the optical medium as phase shifts.

In another feature, the optical medium is formatted using one of a red and a blue-violet laser.

In another feature, an optical disk drive comprises the system.

In still other features, a method comprises downsampling a wobble signal having a wobble period of N channel bits, where N is an integer greater than 1. The method comprises generating a downsampled wobble signal, demodulating the downsampled wobble signal, generating a phase error signal, and writing M bits on an optical medium during the wobble period based on the phase error signal, where M is an integer greater N.

In another feature, the method further comprises demodulating with a demodulating period that is based on at least one of N and a predetermined downsampling factor.

In another feature, the method further comprises reading wobble information from the optical medium and writing data on the optical medium. The method further comprises processing the wobble information and generating an analog wobble signal. The method further comprises generating wobble data for the optical medium based on the analog wobble signal when the wobble information is stored on the optical medium as land pre-pit.

In another feature, the method further comprises converting the analog wobble signal from an analog to a digital format and generating the wobble signal based on the analog wobble signal. The method further comprises generating a clock signal based on the phase error signal, converting the analog wobble signal from an analog to a digital format based on the clock signal, and writing the M bits on the optical medium during the wobble period based on the clock signal.

In another feature, the method further comprises generating wobble data for the optical medium when wobble information is stored on the optical medium as phase shifts.

In still other features, a system comprises downsampler means for downsampling a wobble signal having a wobble period of N channel bits, where N is an integer greater than 1. The system comprises demodulator means for demodulating an output of the downsampling means and generating a phase error signal. The system comprises writing means for writing M bits on an optical medium during the wobble period based on the phase error signal, where M is an integer greater N.

In another feature, the demodulator means has a demodulating period that is based on at least one of N and a predetermined downsampling factor of the downsampler means.

In another feature, the system further comprises optical pickup unit (OPU) means for communicating with the writing means, reading wobble information from the optical medium, and writing data generated by the writing means on the optical medium. The system further comprises analog front-end means for communicating with the OPU means, processing the wobble information, and generating an analog wobble signal.

In another feature, the system further comprises land pre-pit means for communicating with the analog front-end means and generating wobble data for the optical medium based on the analog wobble signal when the wobble information is stored on the optical medium as land pre-pit.

In another feature, the system further comprises analog-to-digital converter (ADC) means for converting the analog wobble signal from analog to digital format and generating the wobble signal based on the analog wobble signal. The system further comprises timing means for communicating with the demodulator means, generating a clock signal based on the phase error signal, and outputting the clock signal to the ADC means and the writing means.

In another feature, the demodulator means generates wobble data for the optical medium when wobble information is stored on the optical medium as phase shifts.

In another feature, the optical medium is formatted using one of a red and a blue-violet laser.

In another feature, an optical disk drive comprises the system.

In still other features, a computer program executed by a processor comprises downsampling a wobble signal having a wobble period of N channel bits, where N is an integer greater than 1. The computer program comprises generating a downsampled wobble signal, demodulating the downsampled wobble signal, generating a phase error signal, and writing M bits on an optical medium during the wobble period based on the phase error signal, where M is an integer greater N.

In another feature, the computer program further comprises demodulating with a demodulating period that is based on at least one of N and a predetermined downsampling factor.

In another feature, the computer program further comprises reading wobble information from the optical medium and writing data on the optical medium. The computer program further comprises processing the wobble information and generating an analog wobble signal. The computer program further comprises generating wobble data for the optical medium based on the analog wobble signal when the wobble data is stored on the optical medium as land pre-pit.

In another feature, the computer program further comprises converting the analog wobble signal from an analog to a digital format and generating the wobble signal based on the analog wobble signal. The computer program further comprises generating a clock signal based on the phase error signal, converting the analog wobble signal from an analog to a digital format based on the clock signal, and writing the M bits on the optical medium during the wobble period based on the clock signal.

In another feature, the computer program further comprises generating wobble data for the optical medium when wobble information is stored on the optical medium as phase shifts.

In still other features, a system comprises an analog-to-digital converter (ADC) module that receives a wobble signal having a wobble period of N channel bits and that generates M samples, where N and M are integers greater than 1. The system comprises an interpolated resampler module that interpolates and resamples the M samples into P samples, where P is an integer greater than 1, and M is greater than P. The system comprises a demodulator module that demodulates an output of the interpolated resampler module and generates a phase error signal. The system comprises a writing module that writes B bits on an optical medium during the wobble period based on the phase error signal, where B is equal to a product of N and M divided by P. The demodulator module has a demodulating period of N channel bits.

In another feature, the system further comprises a timing module that communicates with the demodulator module, that generates a clock signal based on the phase error signal, and that outputs the clock signal to the ADC module and the writing module.

In another feature, the system further comprises an optical pickup unit (OPU) module that communicates with the writing module, that reads wobble information from the optical medium, and that writes data generated by the writing module on the optical medium.

In another feature, the system further comprises an analog front-end module that communicates with the OPU module, that processes the wobble information, and that generates the wobble signal.

In another feature, the system further comprises a land pre-pit module that communicates with the ADC module and that generates wobble data for the optical medium based the wobble signal when wobble information is stored on the optical medium as land pre-pit.

In another feature, the demodulator module generates wobble data for the optical medium when wobble information is stored on the optical medium as phase shifts.

In another feature, the optical medium is formatted using one of a red and a blue-violet laser.

In another feature, an optical disk drive comprises the system.

In still other features, a method comprises receiving a wobble signal having a wobble period of N channel bits, where N is an integer greater than 1. The method comprises converting the wobble signal from an analog to a digital format and generating M samples, where M is an integer greater than 1. The method comprises interpolating and resampling M samples into P samples and generating an interpolated and resampled wobble signal, where P is an integer greater than 1, and M is greater than P. The method comprises demodulating the interpolated and resampled wobble signal, generating a phase error signal, and writing B bits on an optical medium during the wobble period based on the phase error signal, where B is equal to a product of N and M divided by P. The method further comprises demodulating with a demodulating period of N channel bits.

In another feature, the method further comprises generating a clock signal based on the phase error signal, converting the wobble signal from the analog to the digital format based on the clock signal, and writing the B bits on the optical medium during the wobble period based on the clock signal.

In another feature, the method further comprises reading wobble information from the optical medium and writing data on the optical medium. The method further comprises processing the wobble information and generating the wobble signal.

In another feature, the method further comprises generating wobble data for the optical medium based on the wobble signal when wobble information is stored on the optical medium as land pre-pit.

In another feature, the method further comprises generating wobble data for said optical medium when wobble information is stored on said optical medium as phase shifts.

In still other features, a system comprises analog-to-digital converter (ADC) means for receiving a wobble signal having a wobble period of N channel bits and generating M samples, where N and M are integers greater than 1. The system comprises interpolated resampler means for interpolating and resampling the M samples into P samples, where P is an integer greater than 1, and M is greater than P. The system comprises demodulator means for demodulating an output of the interpolated resampler means and generating a phase error signal. The system comprises writing means for writing B bits on an optical medium during the wobble period based on the phase error signal, where B is equal to a product of N and M divided by P. The demodulator means has a demodulating period of N channel bits.

In another feature, the system further comprises timing means for communicating with the demodulator means, generating a clock signal based on the phase error signal, and outputting the clock signal to the ADC means and the writing means.

In another feature, the system further comprises optical pickup unit (OPU) means for communicating with the writing means, reading wobble information from the optical medium, and writing data generated by the writing means on the optical medium.

In another feature, the system further comprises analog front-end means for communicating with the OPU means, processing the wobble information, and generating the wobble signal.

In another feature, the system further comprises land pre-pit means for communicating with the ADC means and generating wobble data for the optical medium based the wobble signal when wobble information is stored on the optical medium as land pre-pit.

In another feature, the demodulator means generates wobble data for said optical medium when wobble information is stored on said optical medium as phase shifts.

In another feature, the optical medium is formatted using one of a red and a blue-violet laser.

In another feature, an optical disk drive comprises the system.

In still other features, a computer program executed by a processor comprises receiving a wobble signal having a wobble period of N channel bits, where N is an integer greater than 1. The computer program comprises converting the wobble signal from an analog to a digital format and generating M samples, where M is an integer greater than 1. The computer program comprises interpolating and resampling the M samples into P samples and generating an interpolated and resampled wobble signal, where P is an integer greater than 1, and M is greater than P. The computer program comprises demodulating the interpolated and resampled wobble signal, generating a phase error signal, and writing B bits on an optical medium during the wobble period based on the phase error signal, where B is equal to a product of N and M divided by P. The computer program further comprises demodulating with a demodulating period of N channel bits.

In another feature, the computer program further comprises generating a clock signal based on the phase error signal, converting the wobble signal from the analog to the digital format based on the clock signal, and writing the B bits on the optical medium during the wobble period based on the clock signal.

In another feature, the computer program further comprises reading wobble information from the optical medium and writing data on the optical medium. The computer program further comprises processing the wobble information and generating the wobble signal.

In another feature, the computer program further comprises generating wobble data for the optical medium based on the wobble signal when wobble data is stored on the optical medium as land pre-pit.

In another feature, the computer program further comprises generating wobble data for said optical medium when wobble information is stored on said optical medium as phase shifts.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present invention will become more fully understood from the detailed description and the accompanying drawings, wherein:

FIG. 8A is a functional block diagram of a high definition television;

FIG. 8B is a functional block diagram of a vehicle control system;

DETAILED DESCRIPTION

Figure 1A:
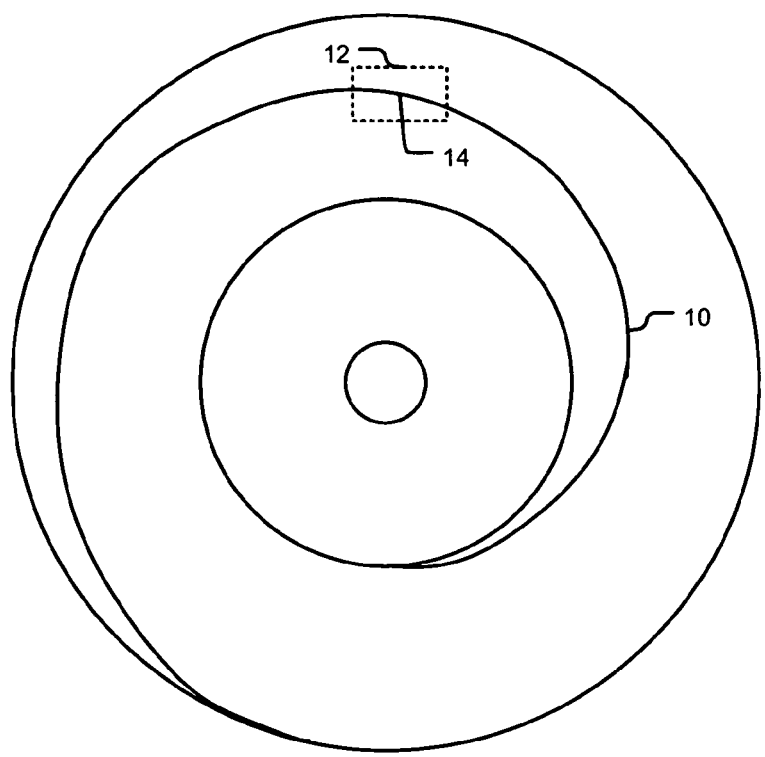
FIG. 1A shows a spiral path of a track on a DVD according to the prior art.
Figure 1B:
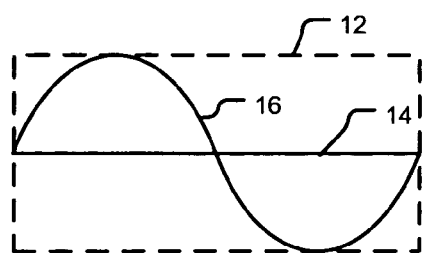
FIG. 1B shows a wobble in a spiral path of a track on a DVD according to the prior art.

The following description is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The storage capacity of an optical medium such as a DVD can be increased by writing data at a density that is higher than a density prescribed by applicable ECMA standards while tracking wobble signals that are generated according to the ECMA standards. Since a period of a wobble signal corresponds to a fixed linear length of the DVD, the storage capacity of the DVD can be increased by writing more than the prescribed amount of data during each period of the wobble signal. Specifically, the storage capacity of the DVD can be increased by increasing a period of timing signals of a wobble demodulator, increasing a downsampling factor of a downsampler used to input signals to the wobble demodulator, or both.

Figure 2:
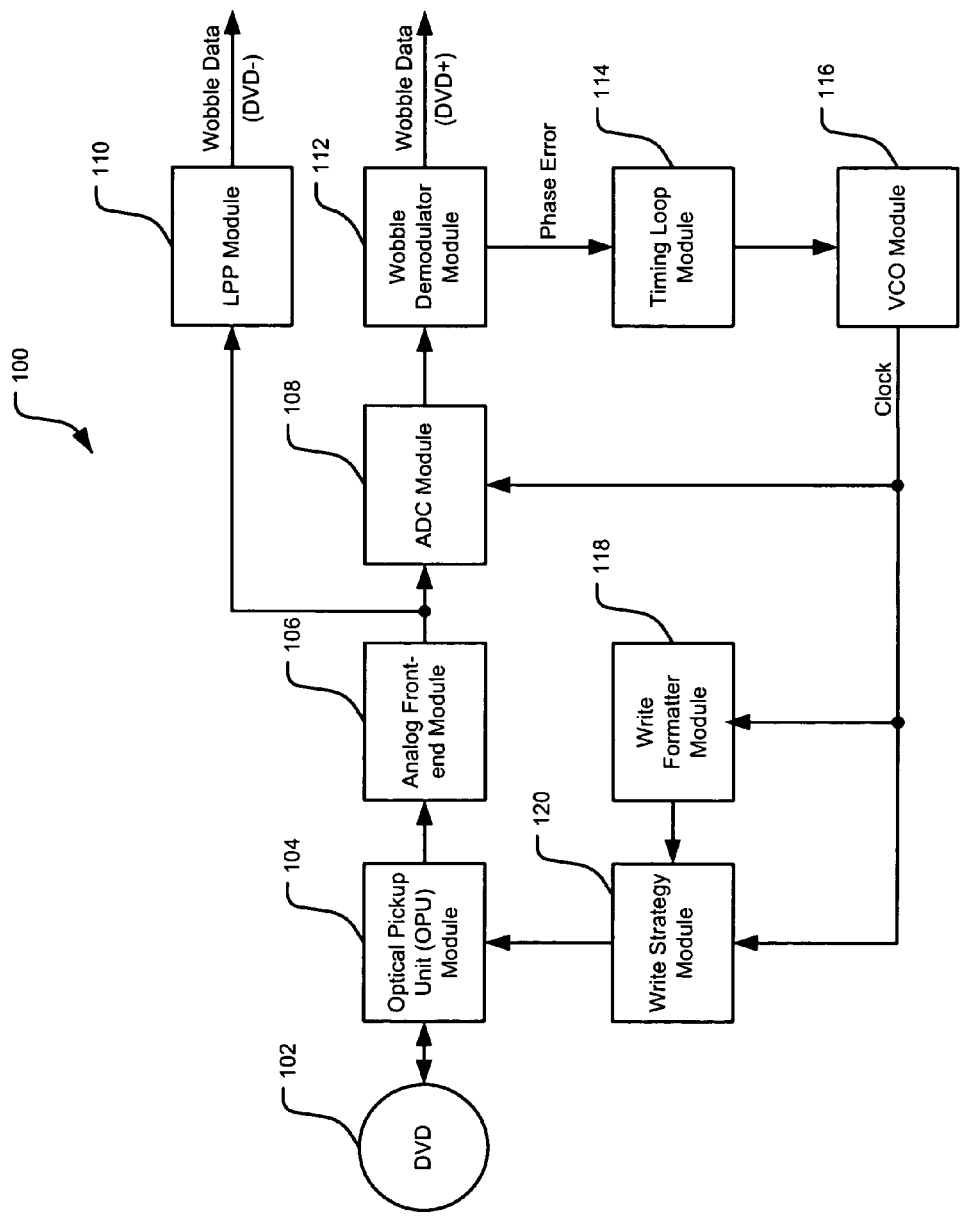
FIG. 2 is a functional block diagram of an exemplary recording system for increasing storage capacity of optical media according to the present disclosure.

Referring now to FIG. 2, a recording system 100 for increasing storage capacity of a DVD 102 comprises an optical pickup unit (OPU) module 104, an analog front-end module 106, an analog-to-digital converter (ADC) module 108, a land pre-pit (LPP) module 110, a wobble demodulator module 112, a timing loop module 114, a voltage-controlled oscillator (VCO) module 116, a write formatter module 118, and a write strategy module 120. The timing loop module 114 and the VCO module 116 may be implemented in a single timing module. Similarly, the write formatter module 118 and the write strategy module may be implemented in a single writing module.

The OPU module 104 reads wobble information from the DVD 102 and writes data on the DVD 102. The wobble information is stored on the DVD 102 in the form of phase shifts when the DVD 102 uses DVD+R or DVD+RW format. The wobble information is stored on the DVD 102 in the form of land pre-pit (LPP) when the DVD 102 uses DVD-R or DVD-RW format. The analog front-end module 106 comprises signal processing modules such as pre-amplifiers, filters, etc., that process the wobble information read by the OPU module 104 from the DVD 102. The analog front-end module 106 generates analog wobble signals. The ADC module 108 converts analog wobble signals generated by the analog front-end module 106 from an analog to a digital format. The ADC module 108 generates digital wobble signals.

When the recording system 100 writes data on the DVD 102 using DVD-R or DVD-RW format (collectively DVD- formats), the analog front-end module 106 provides wobble signals to the LPP module 110. The LPP module 110 generates wobble data for the DVD's using DVD- formats. On the other hand, when the recording system 100 writes data on a DVD using DVD+R or DVD+RW format (collectively DVD+ formats), the wobble demodulator module 112 generates wobble data based on the output of the ADC module 108.

The wobble demodulator module 112 generates phase error signals for DVD+ formats. Based on the phase error signals, the timing loop module 114 synchronizes timing of signals to the timing of wobble signals. The VCO module 116 generates a clock based on the output of the timing loop module 114. The clock controls the ADC module 108, the write formatter module 118, and the write strategy module 120. The write formatter module 118 and the write strategy module 120 generate write signals. The OPU module 104 writes data on the DVD 102 according to the write signals.

The clock rate of the wobble demodulator module 112 corresponds to the period of the wobble signal. According to the standards ECMA-349 and ECMA-337, the wobble signal for DVD+ formats is sinusoidal with a wobble period of 32T, where T is a channel bit period. Wobble data is written in terms of phase shifts. On the other hand, according to the standards ECMA-359 and ECMA-338, the wobble signal for the DVD- formats is sinusoidal with a wobble period of 186T. Wobble data is embedded in the wobble signal as land pre-pit (LPP).

Implementations of the wobble demodulator module 112 differ depending on the format due to two reasons: (1) The periods of wobble signals for DVD+ and DVD- formats differ; and (2) the wobble data is embedded in wobble signals in terms of phase information in DVD+ formats and in terms of LPP information in DVD- formats.

Figure 3:
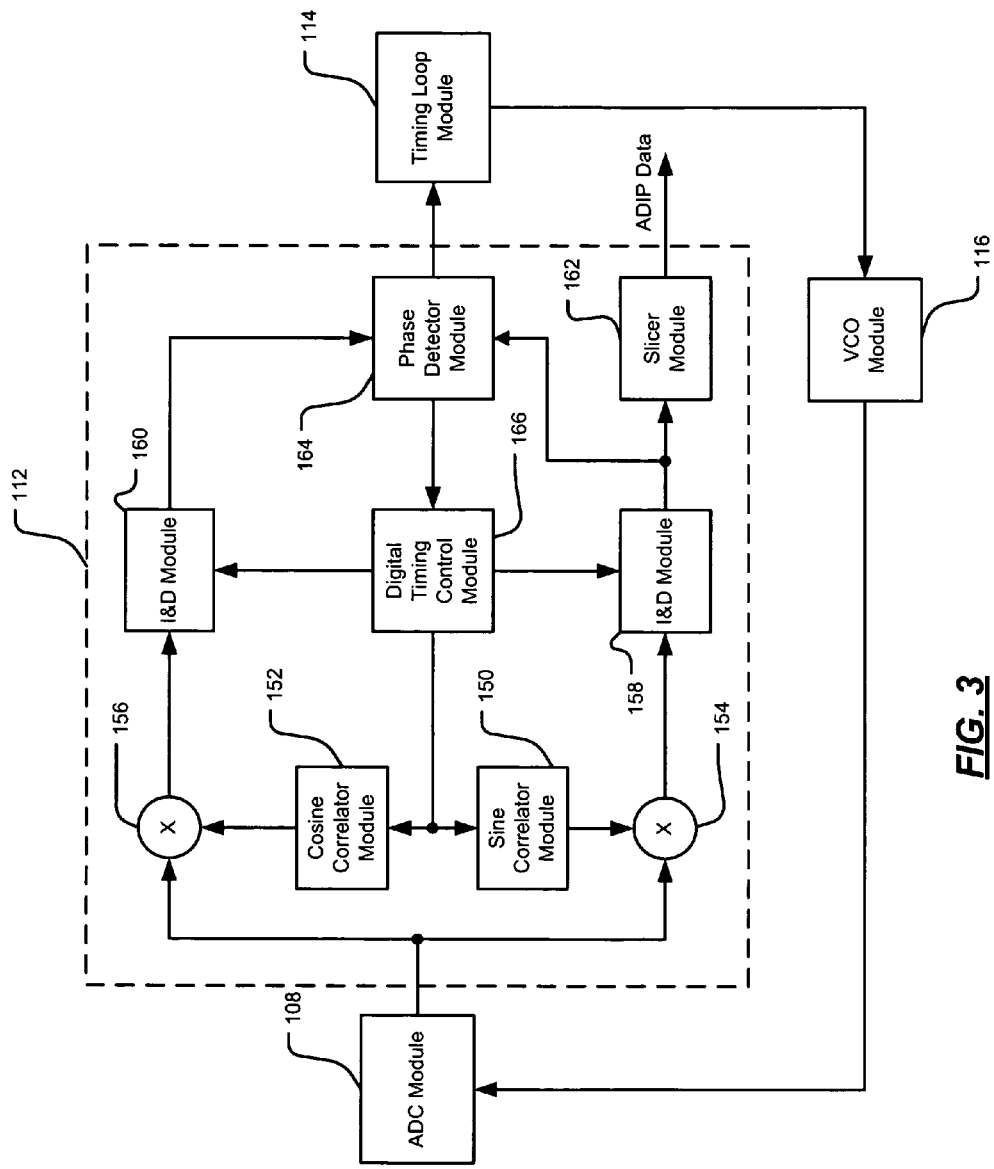
FIG. 3 is a functional block diagram of an exemplary wobble demodulator used in the recording system of FIG. 2 according to the present disclosure.

Referring now to FIG. 3, an exemplary implementation of the wobble demodulator module 112 for DVD+ formats comprises a sine correlator module 150, a cosine correlator module 152, multiplier modules 154 and 156, integrate-and-dump (I&D) modules 158 and 160, a slicer module 162, a phase detector module 164, and a digital timing control module 166. The slicer module 162 is not used for DVD- formats since no phase information is embedded in the wobble signal in DVD- formats.

The output of the ADC module 108 is split into two channels and input to the wobble demodulator module 112. The wobble demodulator module 112 is essentially an I/Q demodulator. The sine correlator module 150 and the cosine correlator module 152 have periods equal to the period of the wobble signal, which is 32T for DVD+ formats and 186T for DVD- formats. An in-phase or I component of the demodulator input is generated using the sine correlator module 150. A quadrature or Q component of the demodulator input is generated using the cosine correlator module 152. Sine correlation is performed by multiplying the input by the output of sine correlator module 150 using the multiplier module 154. Cosine correlation is performed by multiplying the input by the output of cosine correlator module 152 using the multiplier module 156.

The I&D modules 160 and 158 integrate the outputs of the multiplier modules 156 and 154, respectively, over one wobble period, which is 32T for DVD+ formats and 186T for DVD- formats. The outputs of the I&D modules 160 and 158 are called the I component and the Q component, respectively, of the wobble signal.

The slicer module 162 (for DVD+) outputs a "0" if the input is smaller than 0 and a "1" otherwise. The phase detector module 164 outputs a phase offset plus a phase shift, if any. The digital timing control module 166 synchronizes the timing of the sine correlator module 150, the cosine correlator module 152, and the I&D modules 158 and 160.

Mathematically, the wobble signal for DVD+ formats is represented in terms of a radial push-pull (RPP) signal as follows.

$$RPP = \sin(2\pi ft + \theta(t) + \phi)$$

where $f=1/(32T)$ is the normalized wobble frequency, $\phi$ is the phase offset, and $\theta(t)=\pi u(t)$ is the phase information. $u(t)$ is 0 or 1 and indicates absence or presence of phase shift, respectively. The outputs of the I&D modules 160 and 158 are given by the following equations, respectively.

$$I = \sum_{k=0}^{31} \sin\left(2\frac{\pi}{32}k + \theta + \phi\right)\sin\left(2\frac{\pi}{32}k\right) = 16\cos(\theta + \phi)$$

$$Q = \sum_{k=0}^{31} \sin\left(2\frac{\pi}{32}k + \theta + \phi\right)\cos\left(2\frac{\pi}{32}k\right) = 16\sin(\theta + \phi)$$

The output of the slicer module 162 is 0 if the input is smaller than 0 and 1 otherwise. For small phase offsets, the I component is positive when $\theta=0$ and negative when $\theta=\pi$. The output of the phase detector module 164 is the phase offset plus a phase shift, if any.

On the other hand, for DVD- formats, the wobble signal is mathematically represented in terms of a radial push-pull (RPP) signal as follows.

$$RPP = \sin(2\pi ft + \phi)$$

where the normalized wobble frequency is $f=1/(186T)$. The outputs of the I&D modules 158 and 160 are given by the following equations, respectively.

$$Q = \sum_{k=0}^{185} \sin\left(2\frac{\pi}{186}k + \phi\right)\cos\left(2\frac{\pi}{186}k\right) = 93\sin(\phi)$$

$$I = \sum_{k=0}^{185} \sin\left(2\frac{\pi}{186}k + \phi\right)\sin\left(2\frac{\pi}{186}k\right) = 93\cos(\phi)$$

Since the period of the wobble signal is fixed by ECMA standards, the storage capacity of media using DVD+ formats can be increased by writing 33, 34, or more bits instead of 32 bits during the wobble signal period of 32T. Similarly, the storage capacity of media using DVD− formats can be increased by writing 187, 188, or more bits during the wobble signal period of 186T.

Specifically, the storage capacity of the DVD 102 is increased by increasing the periods of the sine correlator module 150 and the cosine correlator 152. For example, to write 34 bits in one wobble period of 32T on the DVD 102 using DVD+ formats, the periods of the sine correlator module 150 and the cosine correlator module 152 are increased from 32T to 34T. The timing loop module 114 and the VCO module 116 generate 34 clock pulses during one wobble period of 32T. The 34 clock pulses drive the ADC module 108, the write formatter module 118, and the write strategy module 120. This increases the storage capacity of the DVD 102 using DVD+ formats by approximately 6%.

Figure 4:
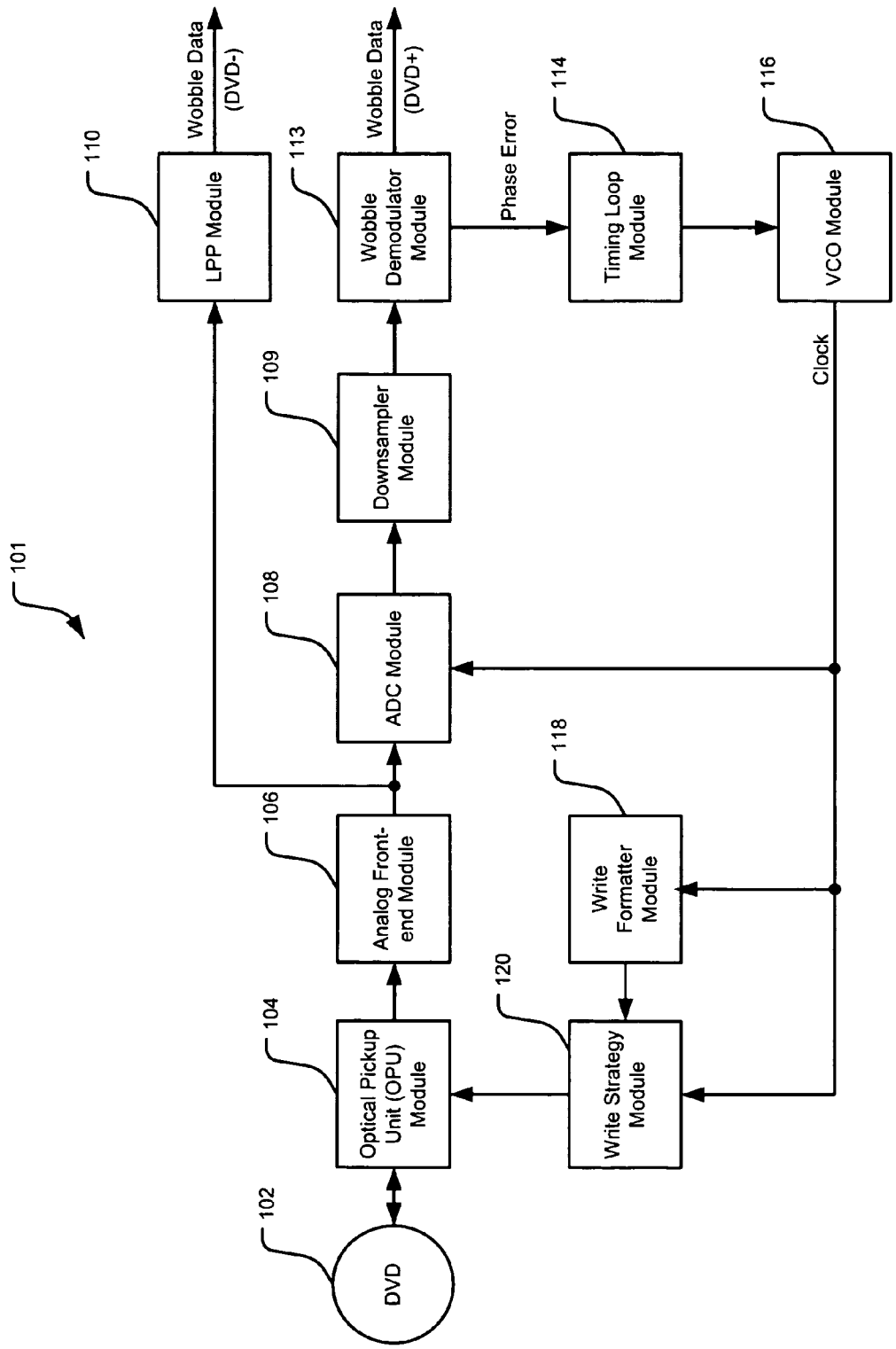
FIG. 4 is a functional block diagram of an exemplary recording system for increasing storage capacity of optical media according to the present disclosure.

Referring now to FIG. 4, a recording system 101 for increasing storage capacity of a DVD 102 utilizes downsampling. The system 101 comprises an optical pickup unit (OPU) module 104, an analog front-end module 106, an analog-to-digital converter (ADC) module 108, a downsampler module 109, a land pre-pit (LPP) module 110, a wobble demodulator module 113, a timing loop module 114, a voltage-controlled oscillator (VCO) module 116, a write formatter module 118, and a write strategy module 120. The timing loop module 114 and the VCO module 116 may be implemented in a single timing module. Similarly, the write formatter module 118 and the write strategy module may be implemented in a single writing module.

The OPU module 104 reads wobble information from the DVD 102 and writes data on the DVD 102. The wobble information is in the form of phase shifts when the DVD 102 uses DVD+R or DVD+RW format. The wobble information is in the form of land pre-pit (LPP) when the DVD 102 uses DVD-R or DVD-RW format.

The analog front-end module 106 comprises signal processing modules such as pre-amplifiers, filters, etc., that process the wobble information read by the OPU module 104 from the DVD 102. The analog front-end module 106 generates analog wobble signals. The ADC module 108 converts the analog wobble signals generated by the analog front-end module 106 from an analog to a digital format. The ADC module 108 generates digital wobble signals. The downsampler module 109 downsamples the output of the ADC module 108 by a predetermined downsampling factor. The downsampler module 109 generates downsampled wobble signals.

When the recording system 101 writes data on the DVD 102 using DVD-R or DVD-RW format (collectively DVD- formats), the analog front-end module 106 provides wobble signals to the LPP module 110. The LPP module 110 generates wobble data for the DVD's using DVD- format. On the other hand, when the recording system 101 writes data on a DVD using DVD+R or DVD+RW format (collectively DVD+ formats), the wobble demodulator module 113 generates wobble data based on the output of the downsampler module 109.

The wobble demodulator module 113 generates phase error signals for DVD+ formats. Based on the phase error signals, the timing loop module 114 synchronizes timing of signals to the timing of wobble signals. The VCO module 116 generates a clock based on the output of the timing loop module 114. The clock controls the ADC module 108, the write formatter module 118, and the write strategy module 120. The write formatter module 118 and the write strategy module 120 generate write signals. The OPU module 104 writes data on the DVD 102 according to the write signals.

The clock rate of the wobble demodulator module 113 corresponds to the period of the wobble signal. Additionally, the clock rate of the wobble demodulator module 113 corresponds to the downsampling factor by which the downsampler module 109 downsamples the digital wobble signal output by the ADC module 108. For example, if the downsampling factor is N, the clock rate of the wobble demodulator module 113 is divided by N.

According to the standards ECMA-349 and ECMA-337, the wobble signal for DVD+ formats is sinusoidal with a wobble period of 32T, where T is a channel bit period. Wobble information is written in terms of phase shifts. On the other hand, according to the standards ECMA-359 and ECMA-338, the wobble signal for the DVD- formats is sinusoidal with a wobble period of 186T. Wobble information is embedded in the wobble signal as land pre-pit (LPP).

Implementations of the wobble demodulator module 113 differ depending on the format due to two reasons: (1) The periods of wobble signals for DVD+ and DVD- formats differ; and (2) the wobble data is embedded in wobble signals in terms of phase information in DVD+ formats and in terms of LPP information in DVD- formats.

Figure 5:
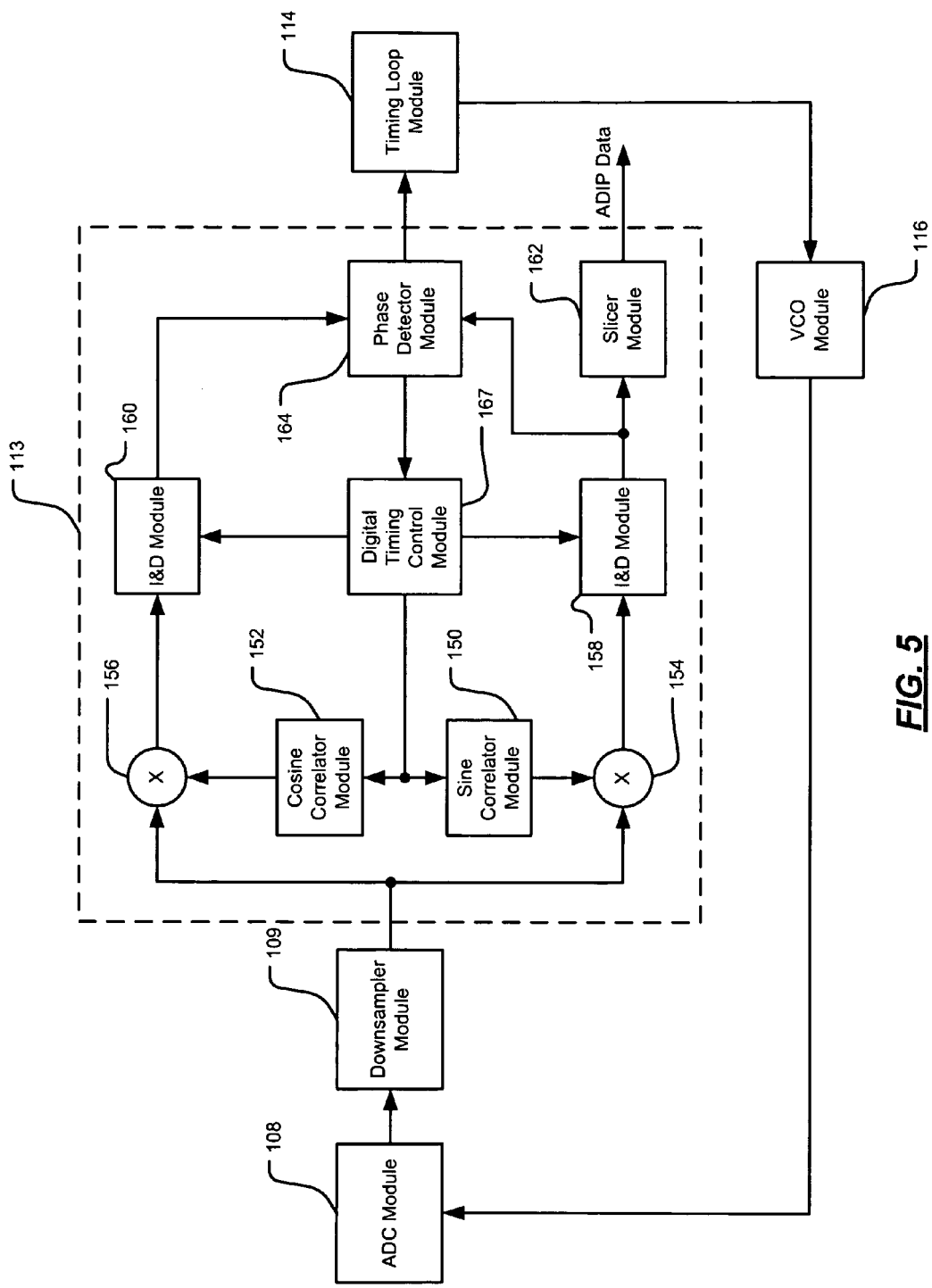
FIG. 5 is a functional block diagram of an exemplary wobble demodulator used in the recording system of FIG. 4 according to the present disclosure.

Referring now to FIG. 5, an exemplary implementation of the wobble demodulator module 113 for DVD+ formats comprises a sine correlator module 150, a cosine correlator module 152, multiplier modules 154 and 156, integrate-and-dump (I&D) modules 158 and 160, a slicer module 162, a phase detector module 164, and a digital timing control module 167. The slicer module 162 is not used for DVD- formats since no phase information is embedded in the wobble signal in DVD- formats.

The output of the downsampler module 109 is split into two channels and input to the wobble demodulator module 113. The wobble demodulator module 113 is essentially an I/Q demodulator. The sine correlator module 150 and the cosine correlator module 154 have periods equal to the period of the wobble signal, which is 32T for DVD+ formats and 186T for DVD-formats. An in-phase or I component of the demodulator input is generated using the sine correlator module 150. A quadrature or Q component of the demodulator input is generated using the cosine correlator module 152. Sine correlation is performed by multiplying the input by the output of sine correlator module 150 using the multiplier module 154. Cosine correlation is performed by multiplying the input by the output of cosine correlator module 152 using the multiplier module 156.

The I&D modules 160 and 158 integrate the outputs of the multiplier modules 156 and 154, respectively, over one wobble period, which is 32T for DVD+ formats and 186T for DVD- formats. The outputs of the I&D modules 160 and 158 are called the I component and the Q component, respectively, of the wobble signal.

The slicer module 162 (for DVD+) outputs a "0" if the input is smaller than 0 and a "1" otherwise. The phase detector module 164 outputs a phase offset plus a phase shift, if any. The digital timing control module 167 synchronizes the timing of the sine correlator module 150, the cosine correlator module 152, and the I&D modules 158 and 160 based on the downsampling factor of the downsampler module 109. For example, the timing control module 167 divides the clock of the wobble demodulator module 113 and corresponding timing of the sine correlator module 150, the cosine correlator module 152, and the I&D modules 158 and 160 by a factor of N if the downsampling factor is N.

Mathematically, the wobble signal for DVD+ formats is represented in terms of a radial push-pull (RPP) signal as follows.

$$RPP = \sin(2\pi ft + \theta(t) + \phi)$$

where $f = 1/(32T)$ is the normalized wobble frequency, $\phi$ is the phase offset, and $\theta(t) = \pi u(t)$ is the phase information. $u(t)$ is 0 or 1 and indicates absence or presence of phase shift, respectively. The outputs of the I&D modules 160 and 158 are given by the following equations, respectively.

$$Q = \sum_{k=0}^{31} \sin\left(2\frac{\pi}{32}k + \theta + \phi\right)\cos\left(2\frac{\pi}{32}k\right) = 16\sin(\theta + \phi)$$

$$I = \sum_{k=0}^{31} \sin\left(2\frac{\pi}{32}k + \theta + \phi\right)\sin\left(2\frac{\pi}{32}k\right) = 16\cos(\theta + \phi)$$

The output of the slicer module 162 is 0 if the input is smaller than 0 and 1 otherwise. For small phase offsets, the I component is positive when $\theta = 0$ and negative when $\theta = \pi$. The output of the phase detector module 164 is the phase offset plus a phase shift, if any.

On the other hand, for DVD− formats, the wobble signal is mathematically represented in terms of a radial push-pull (RPP) signal as follows.

$$RPP = \sin(2\pi ft + \phi)$$

where the normalized wobble frequency is $f = 1/(186T)$. The outputs of the I&D modules 158 and 160 are given by the following equations, respectively.

$$Q = \sum_{k=0}^{185} \sin\left(2\frac{\pi}{186}k + \phi\right)\cos\left(2\frac{\pi}{186}k\right) = 93\sin(\phi)$$

$$I = \sum_{k=0}^{185} \sin\left(2\frac{\pi}{186}k + \phi\right)\sin\left(2\frac{\pi}{186}k\right) = 93\cos(\phi)$$

The clock rate of the wobble demodulator module 113 is changed to correspond to the downsampling factor of the downsampling module 109. For example, if the RPP signal is downsampled by a factor of N, where N is an integer greater than 1, the clock rate of the wobble demodulator module 113 is adjusted to 1/N of the clock rate when downsampling is not used.

Effectively, the periods of the sine correlator module 150 and the cosine correlator module 152 are changed based on the downsampling factor. Nonetheless, the period of the sine correlator module 150 is equal to the period of the cosine correlator module 152. For example, if the RPP signal for DVD+ media is downsampled by a factor of 4, the periods of the sine correlator module 150 and the cosine correlator module 152 are 8T, which is ¼ of the period of 32T when downsampling is not used.

For DVD+ formats, the downsampling factor can be 2, 4, or 8, and the corresponding periods for the sine and cosine correlators can be 16T, 8T, or 4T, respectively. For DVD− formats, the wobble signal with a period of 186T can be downsampled by a factor of 2, 3, 6, or 31, and the corresponding periods for the sine and cosine correlators can be 93T, 62T, 31T, or 6T, respectively.

When downsampling is used, storage capacity can be increased by changing the downsampling factor and/or the clock rate of the wobble demodulator module 113. For example, if the downsampling factor is increased from 4 to 5 for DVD+ formats while the clock rate of the wobble demodulator module 113 is unchanged, the number of bits N that can be written per wobble period is calculated as follows.

For a downsampling factor of 4, the periods of the sine correlator module 150 and the cosine correlator module 152 are equal to 8T, that is, equal to the wobble period of 32T divided by the downsampling factor of 4. When the downsampling factor is increased from 4 to 5, $(N \times T)/5 = 8T$ yields $N = 40$. That is, 40 bits are written instead of 32 during each wobble period of 32T when the downsampling factor is increased from 4 to 5. Instead, if the downsampling factor is unchanged at 4 but if the periods of the sine correlator module 150 and the cosine correlator module 152 are increased from 8T to 9T, $9 \times 4 = 36$ bits are written instead of 32 in one wobble period of 32T.

Similarly, for DVD− formats where the wobble signal period is 186T, the periods of the sine correlator module 150 and the cosine correlator module 152 are 31T for a downsampling factor of 6. A total of 217 can be written during one wobble period if the downsampling factor is increased from 6 to 7.

Thus, the periods of the sine and cosine correlators and/or the clock rate of the wobble demodulator (collectively demodulating periods) are functions of period of wobble signals and/or downsampling factors. As can be appreciated, numerous combinations of downsampling rates and corresponding periods of the sine and cosine correlators can yield different amounts of increase in storage capacity for DVD's.

Figure 6A:
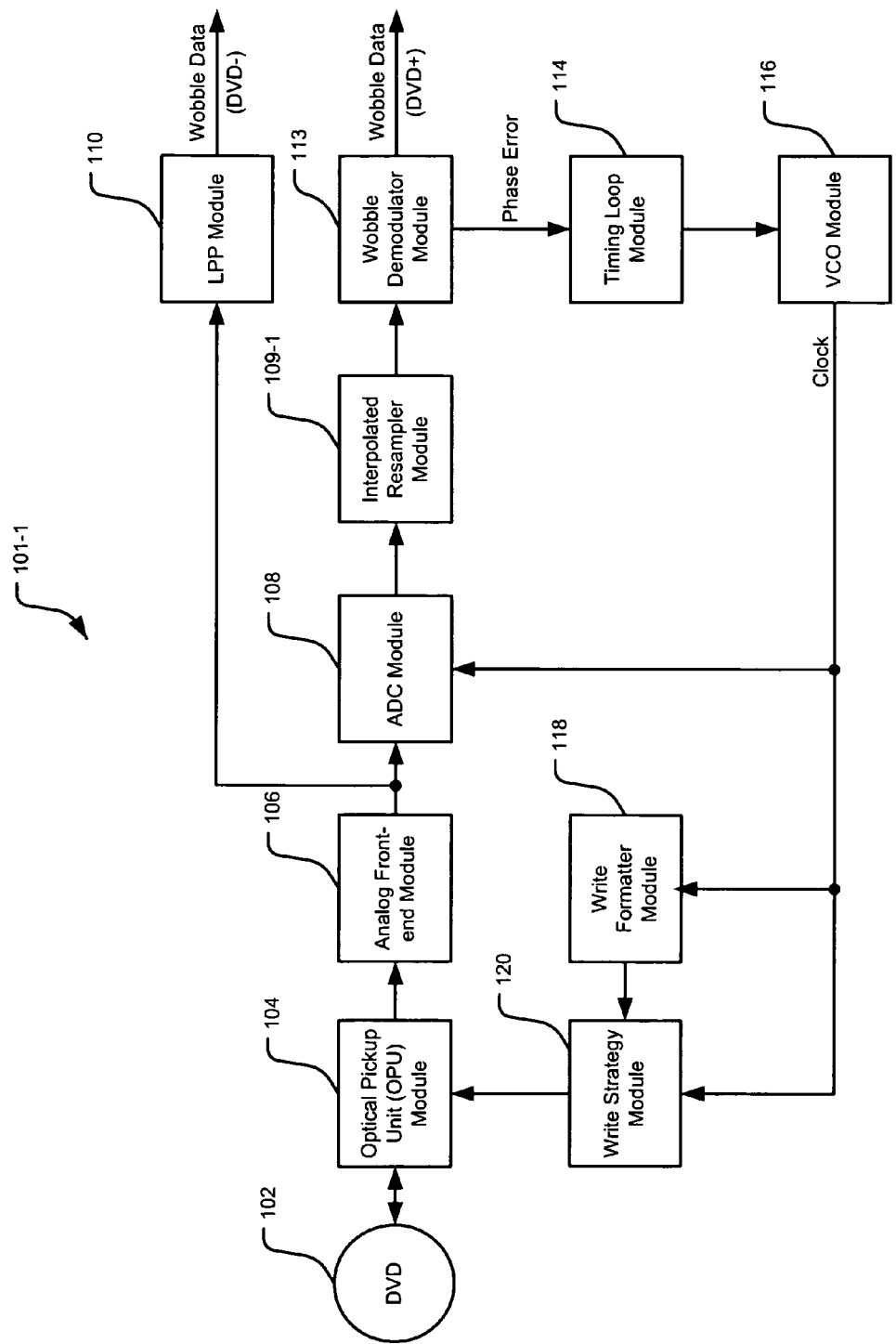
FIG. 6A is a functional block diagram of an exemplary recording system for increasing storage capacity of optical media using according to the present disclosure.
Figure 6B:
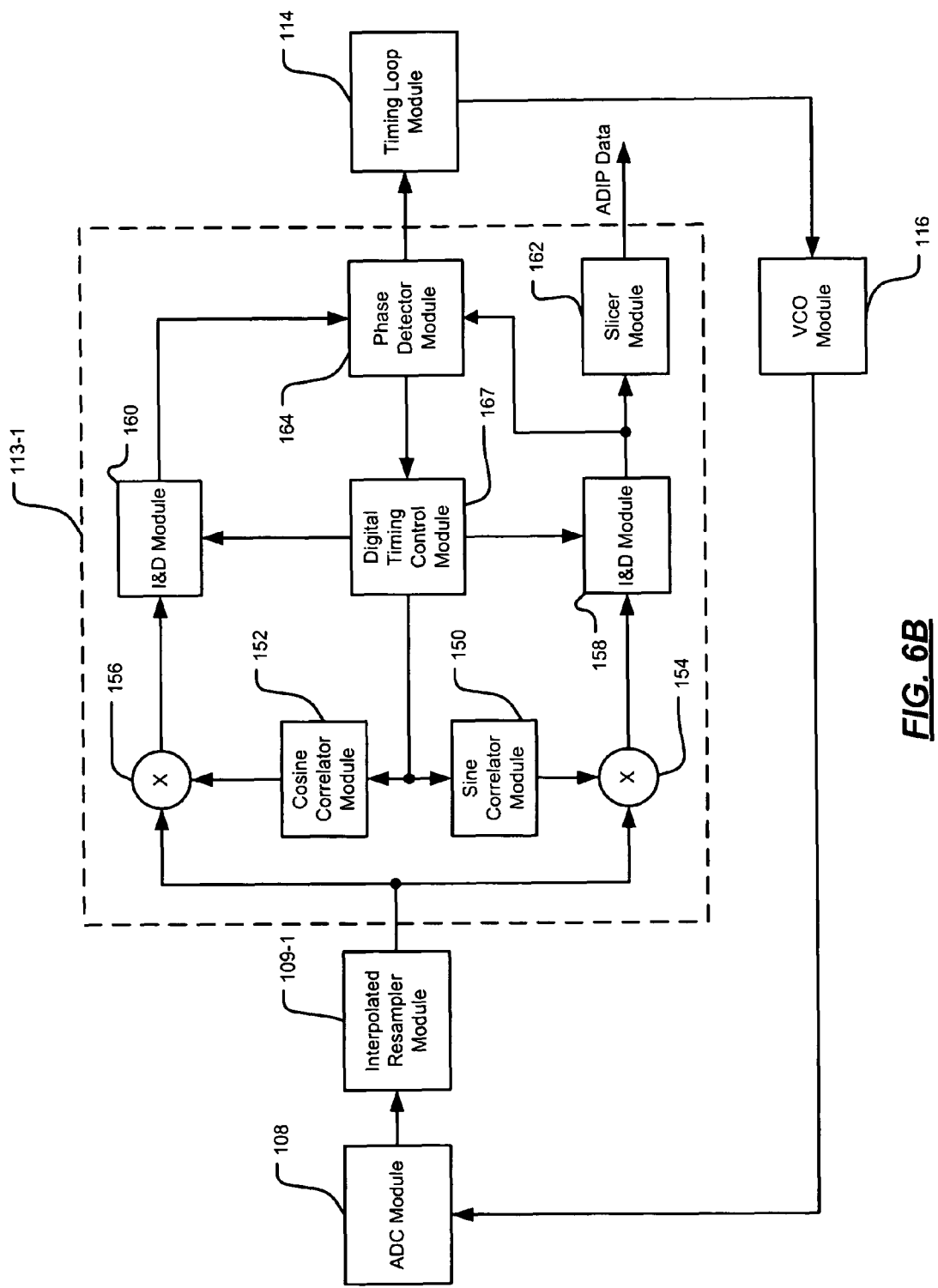
FIG. 6B is a functional block diagram of an exemplary wobble demodulator used in the recording system of FIG. 6A according to the present disclosure.

Referring now to FIGS. 6A-6B, a recording system 101-1 for increasing storage capacity of a DVD 102 utilizes interpolated resampling. Specifically, wobble signal sampled by an ADC module 108 is interpolated and resampled by an interpolated resampler module 109. The interpolated and resampled wobble signal is input to a wobble demodulator module 113-1. FIG. 6B shows an exemplary implementation of the wobble demodulator module 113-1 for DVD+ formats. The clock rate of the wobble demodulator module 113-1 corresponds to the period of the wobble signal. The wobble demodulator module 113-1 generates phase error signals for DVD+ formats based on the interpolated and resampled wobble signal.

For example, samples of wobble signal output by the ADC module 108 may be interpolated and resampled by a sampling factor of 35/32 or at a resampling rate of 35. That is, 35 samples of the ADC module 108 are interpolated and resampled to 32 new samples by the interpolated resampler module 109-1. In that case, 35 bits can be written on the DVD 102 in a wobble period of 32T since the wobble demodulator module 113-1 operates at a clock rate that is equal to the wobble period, which is 32T in this case. Thus, the storage capacity of the DVD 102 is increased by a factor of 35/32 or approximately 9%.

Generally, the sampling factor may be expressed as M/P, where M and P are integers greater than 1 and M is greater than P. Thus, the ratio M/P is greater than 1. If the wobble period is expressed as NT, where N is an integer greater than 1 (e.g., 32T, 186T, etc.), the storage capacity of the DVD 102 is increased from N bits per wobble period to (M/P) times N bits per wobble period.

Figure 6C:
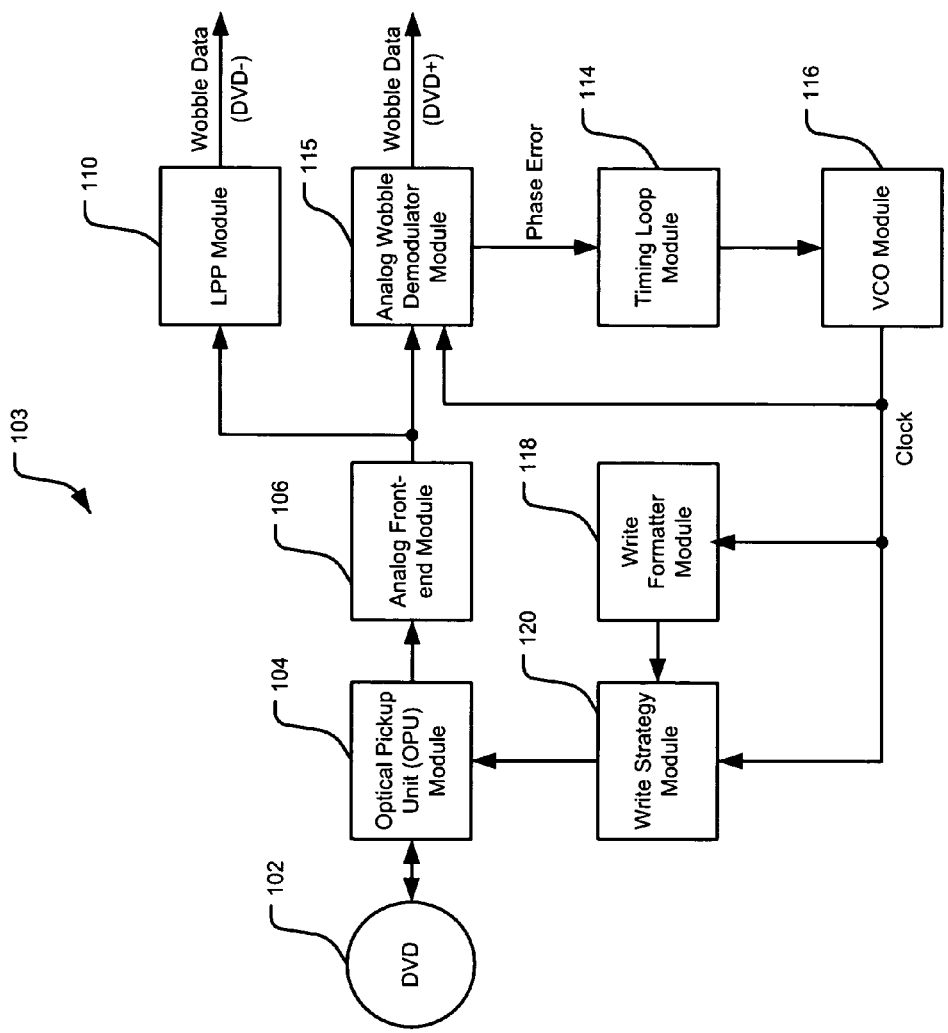
FIG. 6C is a functional block diagram of an exemplary recording system for increasing storage capacity of optical media according to the present disclosure.

Referring now to FIG. 6C, a recording system 103 for increasing storage capacity of a DVD 102 utilizes an analog wobble demodulator module 115. The recording system 103 increases the storage capacity of the DVD 102 using a scheme similar to the scheme used by the recording system 100. Unlike the recording system 100, however, the recording system 103 does not convert wobble signals from an analog to a digital format. Instead, analog wobble signals generated by an analog front-end module 106 are input directly to the analog wobble demodulator module 115. Thus, the recording system 103 does not include an analog-to-digital converter (ADC) module 108.

DVD's written by the recording systems 100, 101, 101-1, and 103 can be read by other DVD players because DVD readers lock on to data written on the DVD's. The storage capacity, however, may be increased only modestly (e.g., by up to 10%) to maintain interchangeability and compatibility across DVD players.

Although the ECMA standards are referenced throughout the disclosure, the systems and methods described herein may be used to increase storage capacity of optical media that use other formats such as high-definition DVD (HD-DVD) and Blu-ray Disc (BD) formats. BD formats include BD-ROM (read-only), BD-R (recordable), BD-RW (rewritable, for personal computers), and BD-RE (rewritable, for high-definition TV recording). Additional details relating to the BD formats can be found in "1. A Physical Format and specifications for BD-RE" ($2^{nd}$ Edition), Blu-ray Disc Association (February 2006), which is incorporated herein by reference in its entirety.

HD-DVD and BD formats use a blue-violet laser of 405 nm wavelength instead of a red laser of 605 nm wavelength used by conventional DVD's. The blue-violet laser can focus on a smaller spot size on a disk due to shorter wavelength than the red laser. Thus, data can be stored in smaller pits on the disk when the blue-violet laser is used instead of the red laser. As a result, a track pitch of HD-DVD's and BD's is smaller than the track pitch of conventional DVD's. Consequently, HD-DVD's and BD's have higher recording densities and storage capacities than conventional DVD's.

Recording systems using HD-DVD and BD formats may use wobble demodulators similar to the wobble demodulators used by conventional DVD systems. Thus, the systems and methods described herein may be used to increase the storage capacity of disks that use HD-DVD and BD formats.

Additionally, systems using HD-DVD and BD formats can be compatible with conventional DVD's. For example, HD-DVD and BD systems can include red and blue-violet laser-diodes in a single-lens optical head to enable the HD-DVD and BD systems to read conventional DVD's. Thus, the systems and methods described herein to increase storage capacity of DVD's may be used to increase storage capacity of HD-DVD's and BD's without affecting compatibility.

Figure 7A:
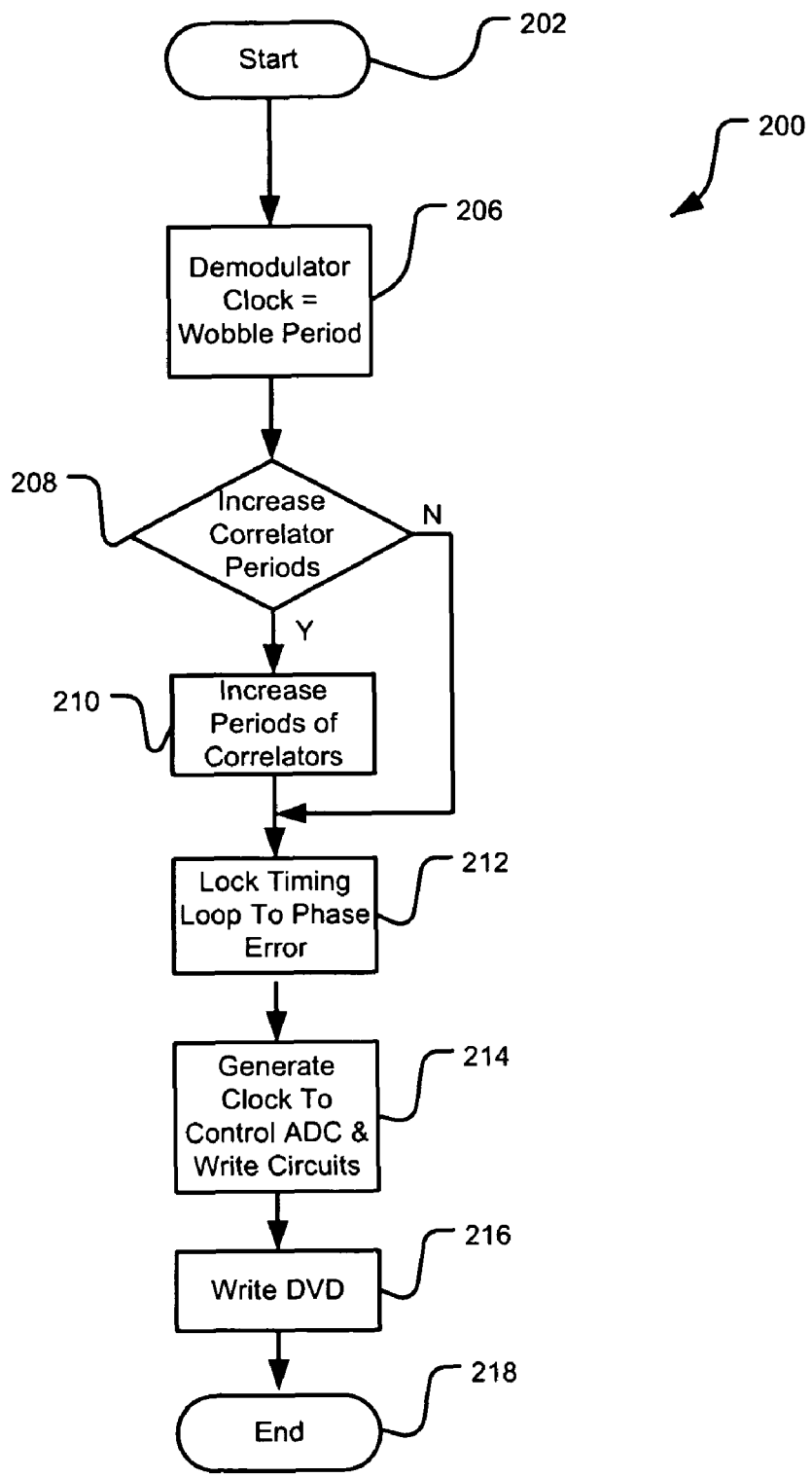
FIG. 7A is a flowchart of an exemplary method for increasing storage capacity of optical media according to the present disclosure.

Referring now to FIG. 7A, a method 200 for increasing storage capacity of optical storage media begins at step 202. A clock rate of a wobble demodulator module 112 is set equal to a period of a wobble signal in step 206. Whether to increase the storage capacity of a DVD 102 by increasing periods of a sine correlator module 150 and a cosine correlator module 152 of the wobble demodulator 112 is determined in step 208.

If true, the periods are increased in step 210. A timing loop module 114 is locked to a phase error generated by the wobble demodulator module 112 in step 212. A VCO module 116 generates a clock to control timing of an ADC module 108, a write formatter module 118, and a write strategy module 120 in step 214. The recording system 100 writes data on the DVD 102 in step 216, and the method 200 ends in step 218. If the result of step 208 is false, the storage capacity of the DVD 102 is unchanged. Steps 212 through 216 are performed, and the method 200 ends in step 218.

Figure 7B:
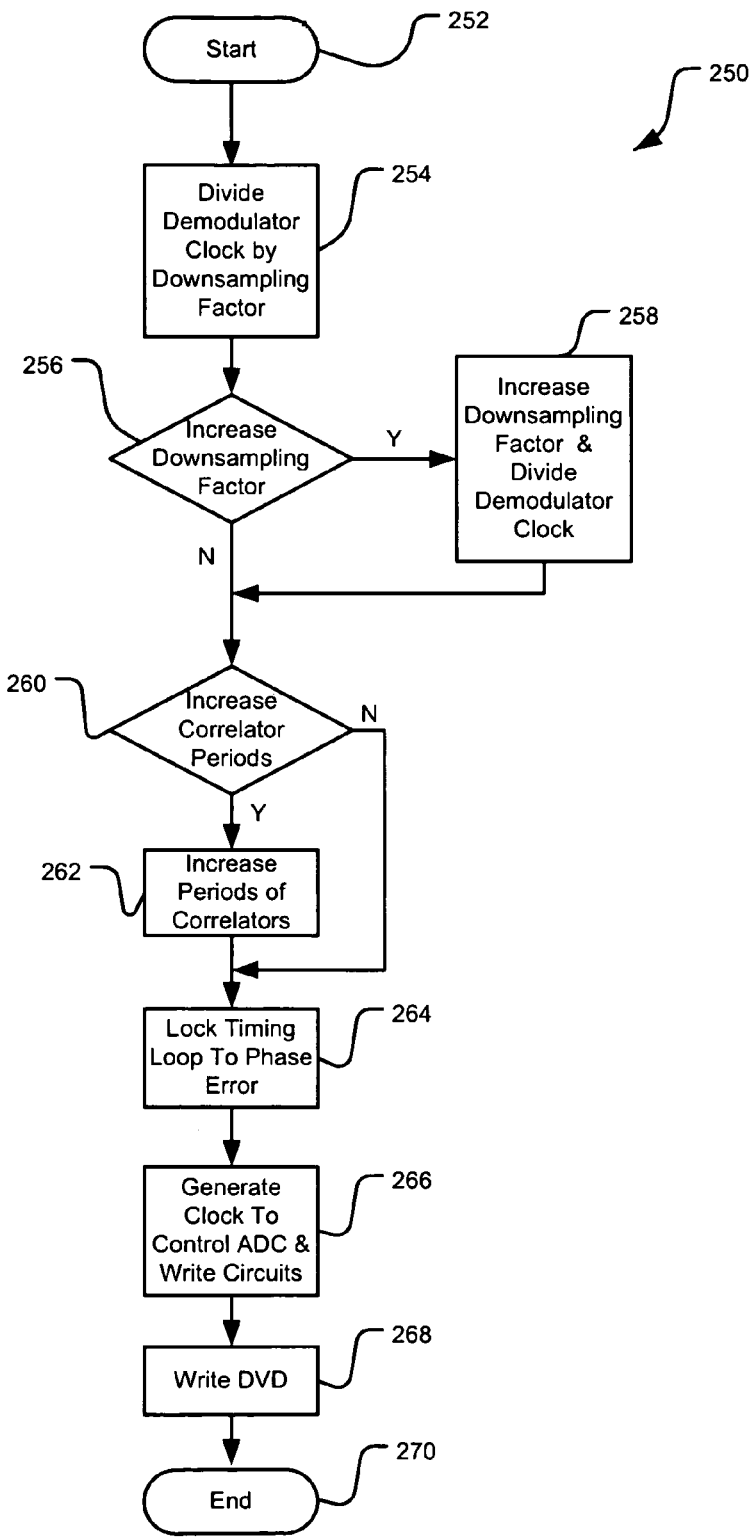
FIG. 7B is a flowchart of an exemplary method for increasing storage capacity of optical media according to the present disclosure.

Referring now to FIG. 7B, a method 250 for increasing storage capacity of optical storage media using downsampling begins at step 252. A digital timing control module 167 in a wobble demodulator module 113 divides a clock of the wobble demodulator module 113 in step 254 by a downsampling factor used by a downsampler module 109. Whether to increase the downsampling factor is determined in step 256. If true, the downsampling factor is increased and the clock is divided by the downsampling factor in step 258.

Regardless, whether to increase the capacity of a DVD 102 by increasing periods of a sine correlator module 150 and a cosine correlator module 152 of the wobble demodulator 112 is determined in step 260. If true, the periods are increased in step 262 in addition to increasing the downsampling factor in step 258.

Nonetheless, a timing loop module 114 is locked to a phase error generated by the wobble demodulator module 113 in step 264. A VCO module 116 generates a clock to control timing of an ADC module 108, a write formatter module 118, and a write strategy module 120 in step 266. The recording system 101 writes data on the DVD 102 in step 268, and the method 250 ends in step 270.

Figure 8C:
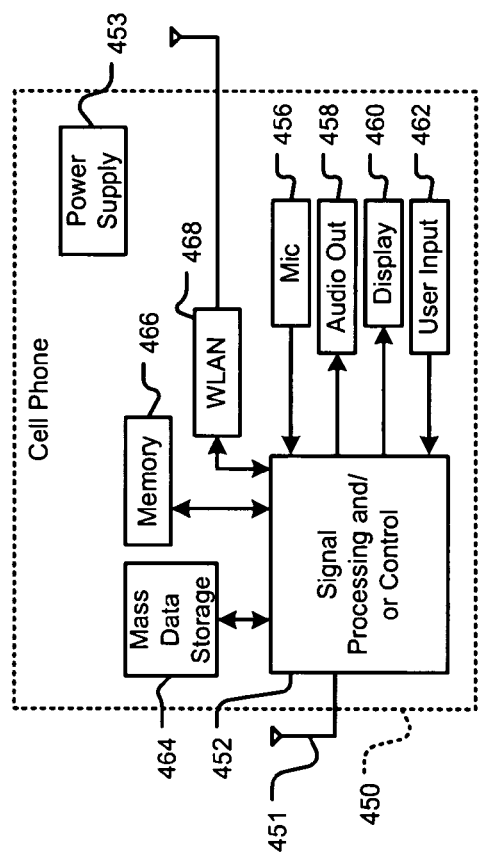
FIG. 8C is a functional block diagram of a cellular phone.

Referring now to FIGS. 8A-8E, various exemplary implementations of the systems and method disclosed in the present disclosures are shown. Referring now to FIG. 8A, the systems and methods disclosed in the present disclosure can be implemented in mass data storage 427 of a high definition television (HDTV) 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. The systems and methods disclosed in the present disclosure may be implemented in at least one optical storage device. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Referring now to FIG. 8B, the systems and methods disclosed in the present disclosure may be implemented mass data storage 446 of a control system of a vehicle 430. In some implementations, the systems and methods disclosed in the present disclosure may be implemented in a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The systems and methods disclosed in the present disclosure may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices such as hard disk drives HDD and/or DVDs. The systems and methods disclosed in the present disclosure may be implemented in at least one DVD. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Referring now to FIG. 8C, the systems and methods disclosed in the present disclosure can be implemented in mass data storage 464 of a cellular phone 450 that may include a cellular antenna 451. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. The systems and methods disclosed in the present disclosure may be implemented in at least one DVD. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 8D:
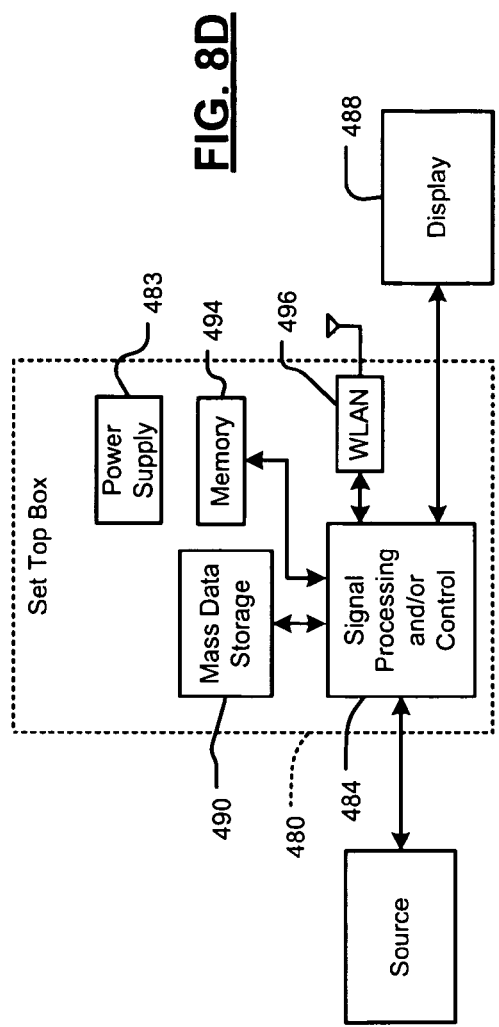
FIG. 8D is a functional block diagram of a set top box.

Referring now to FIG. 8D, the systems and methods disclosed in the present disclosure can be implemented in mass data storage 490 of the set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. The systems and methods disclosed in the present disclosure may be implemented in at least one DVD. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 8E:
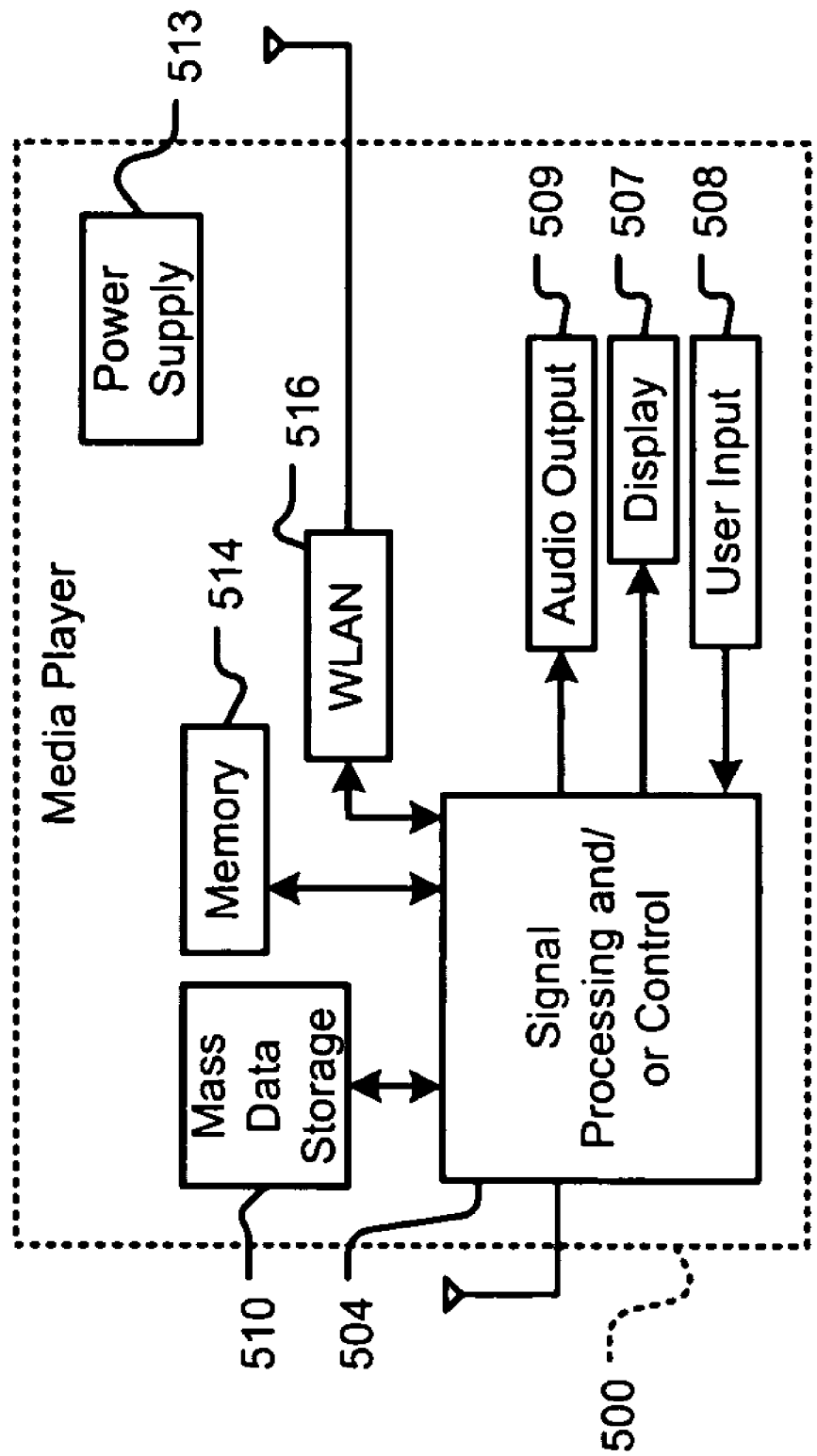
FIG. 8E is a functional block diagram of a media player.

Referring now to FIG. 8E, the systems and methods disclosed in the present disclosure can be implemented in mass data storage 510 of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The systems and methods disclosed in the present disclosure may be implemented in at least one DVD. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system, comprising:
   a demodulator module that demodulates a wobble signal having a wobble period of N channel bits, that has a demodulating period of M channel bits, and that generates a phase error signal, where N and M are integers greater than 1, and M is greater than N; and
   a writing module that writes M bits on an optical medium during said wobble period based on said phase error signal.

2. The system of claim 1 further comprising an optical pickup unit (OPU) module that communicates with said writing module, that reads wobble information from said optical medium, and that writes data generated by said writing module on said optical medium.

3. The system of claim 2 further comprising an analog front-end module that communicates with said OPU module, that processes said wobble information, and that generates said wobble signal.

4. The system of claim 3 further comprising a land pre-pit module that communicates with said analog front-end module and that generates wobble data for said optical medium based on said wobble signal when said wobble information is stored on said optical medium as land pre-pit.

5. The system of claim 3 wherein said demodulator module generates said phase error signal based on said wobble signal and generates wobble data for said optical medium based on said wobble signal when said wobble information is stored on said optical medium as phase shifts.

6. The system of claim 3 further comprising an analog-to-digital converter (ADC) module that converts said wobble signal from analog to digital format, that generates a digital wobble signal, and that outputs said digital wobble signal to said demodulator module.

7. The system of claim 6 wherein said demodulator module generates said phase error signal based on said digital wobble signal and generates wobble data for said optical medium based on said digital wobble signal when said wobble information is stored on said optical medium as phase shifts.

8. The system of claim 6 further comprising a timing module that communicates with said demodulator module, that generates a clock signal based on said phase error signal, and that outputs said clock signal to said ADC module.

9. The system of claim 6 further comprising a downsampler module that downsamples said digital wobble signal by a predetermined downsampling factor, that generates a downsampled wobble signal, and that outputs said downsampled wobble signal to said demodulator module.

10. The system of claim 9 wherein said demodulating period of said demodulator module is based on said predetermined downsampling factor.

11. The system of claim 9 wherein said demodulator module generates said phase error signal based on said downsampled wobble signal and generates wobble data for said optical medium based on said downsampled wobble signal when said wobble information is stored on said optical medium as phase shifts.

12. The system of claim 1 further comprising a timing module that communicates with said demodulator module, that generates a clock signal based on said phase error signal, and that outputs said clock signal to said writing module.

13. The system of claim 1 wherein said optical medium is formatted using one of a red and a blue-violet laser.

14. An optical disk drive comprising the system of claim 1.

15. A method, comprising:
   demodulating a wobble signal having a wobble period of N channel bits with a demodulating period of M channel bits, where N and M are integers greater than 1, and M is greater than N;
   generating a phase error signal; and
   writing M bits on an optical medium during said wobble period based on said phase error signal.

16. The method of claim 15 further comprising reading wobble information from said optical medium and writing data on said optical medium.

17. The method of claim 16 further comprising processing said wobble information and generating said wobble signal.

18. The method of claim 17 further comprising generating wobble data for said optical medium based on said wobble signal when said wobble information is stored on said optical medium as land pre-pit.

19. The method of claim 17 further comprising generating said phase error signal based on said wobble signal and generating wobble data for said optical medium based on said wobble signal when said wobble information is stored on said optical medium as phase shifts.

20. The method of claim 17 further comprising converting said wobble signal from an analog to a digital format and generating a digital wobble signal.

21. The method of claim 20 further comprising generating said phase error signal based on said digital wobble signal and generating wobble data for said optical medium based on said digital wobble signal when said wobble information is stored on said optical medium as phase shifts.

22. The method of claim 20 further comprising generating a clock signal based on said phase error signal and converting said wobble signal from an analog to a digital format based on said clock signal.

23. The method of claim 20 further comprising downsampling said digital wobble signal by a predetermined downsampling factor and generating a downsampled wobble signal.

24. The method of claim 23 wherein said demodulating period is based on said predetermined downsampling factor.

25. The method of claim 23 further comprising generating said phase error signal based on said downsampled wobble signal and generating wobble data for said optical medium based on said downsampled wobble signal when said wobble information is stored on said optical medium as phase shifts.

26. The method of claim 15 further comprising generating a clock signal based on said phase error signal and writing said M bits on said optical medium during said wobble period based on said clock signal.

27. A system, comprising:
   a demodulator module configured to
      demodulate a wobble signal located on an optical medium, wherein (i) the wobble signal has a wobble period of N channel bits and (ii) the demodulator module has a demodulating period of M channel bits, where N and M are integers greater than 1, and M is greater than N, and
      generate a phase error signal based on a timing associated with the demodulating period of M channel bits;
   a timing module configured to use the phase error signal to synchronize a clock signal to the timing associated with the demodulating period of M channel bits; and
   a writing module configured to write, based on the clock signal, M bits on the optical medium during a given wobble period of N channel bits.

28. The system of claim 27, further comprising an optical pickup unit (OPU) module in communication with the writing module, wherein the OPU is configured to:
   read wobble information from the optical medium, and
   write data generated by the writing module on the optical medium.

29. The system of claim 28, further comprising an analog front-end module in communication with the OPU module, wherein the analog front-end module is configure to generate the wobble signal based on the wobble information.

30. The system of claim 29, wherein:
   the wobble information is stored on the optical medium as land pre-pit; and
   the system further comprises a land pre-pit module in communication with the analog front-end module, wherein the land pre-pit module is configured to
      generate wobble data for the optical medium based on the wobble signal.

31. The system of claim 29, wherein:
the wobble information is stored on the optical medium as phase shifts; and
the demodulator module is configured to:
generate the phase error signal based on the wobble signal, and
generate wobble data for the optical medium based on the wobble signal.

32. The system of claim 29, further comprising an analog-to-digital converter (ADC) module configured to:
convert the wobble signal from analog to digital format,
generate a digital wobble signal, and
output the digital wobble signal to the demodulator module.

33. The system of claim 32, wherein:
the wobble information is stored on the optical medium as phase shifts; and
the demodulator module is configured to:
generate the phase error signal based on the digital wobble signal, and
generate wobble data for the optical medium based on the digital wobble signal.

34. The system of claim 32, wherein the timing module is configured to:
generate the clock signal based on the phase error signal, and
output the clock signal to the ADC module.

35. The system of claim 32, further comprising a downsampler module configured to:
downsample the digital wobble signal by a predetermined downsampling factor,
generate a downsampled wobble signal, and
output the downsampled wobble signal to the demodulator module.

36. The system of claim 35, wherein the demodulating period of the demodulator module is based on the predetermined downsampling factor.

37. The system of claim 35, wherein:
the wobble information is stored on the optical medium as phase shifts; and
the demodulator module is configured to:
generate the phase error signal based on the downsampled wobble signal, and
generate wobble data for the optical medium based on the downsampled wobble signal.

38. The system of claim 27, wherein the optical medium is formatted using one of a red and a blue-violet laser.

39. An optical disk drive comprising the system of claim 27.

* * * * *